(12) United States Patent
Umeda et al.

(10) Patent No.: US 6,700,236 B2
(45) Date of Patent: Mar. 2, 2004

(54) LIQUID-COOLED VEHICLE ROTARY ELECTRIC MACHINE

(75) Inventors: Atsushi Umeda, Okazaki (JP); Tsutomu Shiga, Nukata-gun (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/725,081

(22) Filed: Nov. 29, 2000

(65) Prior Publication Data

US 2001/0002093 A1 May 31, 2001

(30) Foreign Application Priority Data

Nov. 30, 1999 (JP) .......................... 11-340558

(51) Int. Cl.⁷ .............. H02K 9/00; H02K 9/20; H02K 9/08; H02K 5/00; H02K 1/00
(52) U.S. Cl. .............. 310/54; 310/57; 310/89; 310/179; 310/201
(58) Field of Search .............. 310/54, 57, 89, 310/179, 201

(56) References Cited

U.S. PATENT DOCUMENTS

| | | | | |
|---|---|---|---|---|
| 2,862,120 A | * | 11/1958 | Onsrud | 165/146 |
| 4,739,204 A | * | 4/1988 | Kitamura et al. | 310/68 D |
| 4,818,906 A | * | 4/1989 | Kitamura et al. | 310/58 |
| 4,870,307 A | * | 9/1989 | Kitamura et al. | 310/54 |
| 4,922,148 A | * | 5/1990 | Kitamura | 310/68 D |
| 4,955,944 A | | 9/1990 | Aso et al. | 123/41.31 |
| 4,980,588 A | * | 12/1990 | Ogawa | 370/68 D |
| 5,836,270 A | * | 11/1998 | Aoki et al. | 123/41.31 |
| 5,929,543 A | * | 7/1999 | Zeyen et al. | 310/52 |
| 5,939,808 A | * | 8/1999 | Adames | 310/54 |
| 5,965,965 A | * | 10/1999 | Umeda et al. | 310/52 |
| 5,982,068 A | | 11/1999 | Umeda et al. | 310/206 |
| 5,994,813 A | * | 11/1999 | Umeda et al. | 310/180 |
| 5,997,261 A | * | 12/1999 | Kershaw et al. | 310/54 |
| 5,998,903 A | | 12/1999 | Umeda et al. | 310/179 |
| 6,011,332 A | * | 1/2000 | Umeda et al. | 310/58 |
| 6,046,520 A | * | 4/2000 | Betsch et al. | 310/54 |
| 6,137,201 A | * | 10/2000 | Umeda et al. | 310/179 |
| 6,147,430 A | * | 11/2000 | Umeda et al. | 310/215 |
| 6,160,332 A | * | 12/2000 | Tsuruhara | 310/54 |
| 6,300,693 B1 | * | 10/2001 | Poag et al. | 310/54 |
| 6,313,556 B1 | * | 11/2001 | Dombrovski et al. | 29/596 |

FOREIGN PATENT DOCUMENTS

EP 0 302 118 A1 2/1988
JP 11-146606 5/1999

OTHER PUBLICATIONS

Guru & Hiziroglu, Electric Machinery & Transformers, Jan. 1995, 2$^{nd}$ Ed. 402–406 & 455–457.*

* cited by examiner

Primary Examiner—Nicholas Ponomarenko
Assistant Examiner—Pedro J. Cuevas
(74) Attorney, Agent, or Firm—Oliff & Berridge, PLC (57) ABSTRACT

A liquid-cooled vehicle generator-motor includes a frame having a liquid passage, a stator core fixedly fitted to the inner periphery of the frame, a multi-phase stator winding accommodated in the plurality of slots of the stator core, and a rotor disposed inside the stator core. The stator winding includes a plurality of insulated U-shaped conductor segments each of which has a pair of legs. Each leg is inserted in a slot from one end of the stator core and paired to another at a portion extending from the other end of the stator.

21 Claims, 8 Drawing Sheets

LIQUID-COOLED VEHICLE ROTARY ELECTRIC MACHINE

CROSS REFERENCE TO RELATED APPLICATION

The present application is based on and claims priority from Japanese Patent Application Hei 11-340558 filed Nov. 30, 1999, the contents of which are incorporated herein by reference.

BACKGROUND OF THE INVENTION

1. Field of the Invention

The present invention relates to a liquid-cooled vehicle rotary electric machine driven by an internal combustion engine mounted in a vehicle, such as a passenger car or a truck.

2. Description of the Related Art

Recently, it has been considered to use a vehicle AC generator for engine-idling-stop system or an engine-torque assisting system.

U.S. Pat. No. 4,955,944 proposes a liquid-cooled rotary electric machine that has a liquid-cooled frame and a stator core fixedly fitted to the frame.

JP-A-11-146606 proposes a liquid-cooled vehicle rotary electric machine in which coil ends of a stator winding are covered with insulation resin to be cooled by cooling liquid. It is necessary to cool the stator winding by cooling liquid because the coil ends is subject to a high temperature due to its poor heat conduction.

JP-B2-2927288 proposes a vehicle AC generator in which each of a plurality of U-shaped conductor segments (hereinafter referred to as U-segment) is inserted into a pair of slots and each of the ends of the inserted U-segments is serially connected to another to form a stator winding.

As the engine idling speed has been decreasing, it has been demanded to increase electric power. On the other hand, an engine compartment has been made more compact, and a more compact vehicle AC generator has been required. The above demands have necessarily increased the maximum current or the current density of the stator winding of the generator and temperature thereof. In other words, cooling performance of the stator winding is one of decisive factors of the size of a rotary electric machine.

In a generator-motor that has a motor-function to be used for an engine-idling stop system or an engine-torque assist system, it is necessary to supply much more input current to the stator winding thereof than the output current to generate by the stator winding. As a result, the stator winding of the generator-motor presents much more serious temperature-rise problems than ordinary generators.

In order to improve cooling performance of conventional open-type air-cooled vehicle AC generator, it is possible to adopt the above liquid-cooled frame. It was found that the temperature of the stator of the rotary electric machine having the liquid-cooled frame does not become as low as the ordinary rotary electric machine, although the former has more complicated structure. This is one of major reasons why the rotary electric machine having the liquid-cooled frame has not been put into practical use.

The other liquid-cooled vehicle rotary electric machine having multi-layered coil ends that are cooled by cooling liquid via a resinous insulator has also the following problems. It is very difficult to fill resinous material into gaps of the coil ends that are not evenly distributed. Therefore, the temperature of the conductors inside the coil ends becomes so high that the resinous material cracks due to a difference in thermal expansion between the resinous material and the conductors of the coil ends. As a result, cooling liquid (or water) may get into the inside of the coil ends through the cracks, causing short-circuiting or grounding.

There is the highest heat-transmission resistance between portions of conductor segments inside the slots and the insulators. Because the stator winding of the conventional liquid-cooled rotary electric machine is formed of round-wire coils wound one after another by a winding machine, it is very difficult to increase the conduction space factor of the slot to a certain higher value or to reduce dead spaces from the slot.

When the winding is wound by a winding machine in the manner described above, the coils overlap each other in a plurality of layers and swell in the radial direction. However, the number of conductors of the coil ends has to be limited because the spaces at opposite ends of the stator core are limited for the coil ends. This also obstructs to increase in the space factor.

Because considerably large portions of the slots are occupied by the dead spaces, the temperature of the stator winding becomes much higher than the temperature of the insulators and the stator core although a liquid-cooled frame is provided.

SUMMARY OF THE INVENTION

The present invention has been made in view of the above problems. Therefore, a main object of the invention is to provide a compact and powerful liquid-cooled rotary electric machine.

A main feature of the invention is a rotary electric machine that includes a liquid-cooled frame in which liquid flows and a stator core that is fixedly fitted to the inner periphery of the frame. A stator winding is formed of a plurality of serially connected U-segments. The stator winding having the serially connected U-segments provides excellent cooling performance. As a result, a drastically smaller size-to-current ratio can be achieved.

There is a heat transmission channel in the rotary electric machine having a liquid-cooled frame between the heat generating stator winding and the cooling liquid. Heat is transmitted through the channel from the stator winding (including resinous insulation coating), insulators disposed between the stator winding and surfaces of slots, a stator core, a frame and the cooling liquid.

The U-segment has much larger cross-sectional area than any other round wire conductor. The U-segment also has a rectangular cross-section that is fitted to the cross-sectional shape of the slot with very small spaces being interposed.

As the cross-sectional area is, increased, the number of portions of the U-segment disposed in the slots (hereinafter referred to as the in-slot portions) can be reduced. The rectangular cross-section of the U-segment makes each in-slot portion thereof close contact with the inner wall of the slot via an insulator, thereby reducing the heat-transmission resistance.

Because of a large conduction space factor of the slot, the stator winding at the rotary electric machine according to the invention has a large cross-sectional area, which provides a low resistance of the stator winding and low temperature thereof and a high current capacity.

Because the space necessary for the coil-ends of the serially connected U-shaped conductor-segment type stator winding is small, the conduction space factor of the slot is not limited by the coil-end space, and the temperature of the stator winding can be reduced further.

For example, the conduction space factor of the slot of a conventional winding type stator is less than 50%. This is because the cross-sectional area cannot be increased due to difficulty in the winding process.

If the cross-sectional area of the slot of the stator is the same, the heat capacity of the stator winding of the rotary electric machine according to the invention can be made much larger than the conventional rotary electric machine. This can suppress a temperature rise even if the stator winding is supplied with a large amount of current in a short time.

Because the cross-sectional factor of the conductor segment increases, the rigidity thereof increases. The coil ends can be shaped evenly with distances between the inner periphery of the frame and the coil ends become even. Therefore, it is possible to reduce the diameter of the frame, so that the generator can be made compact.

According to another feature of the invention, the rotary electric machine is enclosed liquid-tightly. Therefore, the stator winding becomes resistant to environmental severe conditions.

According to another feature of the invention, each of the in-slot portions is closely fitted to one of the plurality of slot via an insulator. This prevents excessive temperature rise of a limited area of the in-slot portions.

According to another feature of the invention, the number of the slots is larger than the product of the number of the magnetic poles and the number of the phase of the stator.

Because the coil ends do not closely overlap one another in the radial direction, a high conduction space factor can be provided. Because the conductor segments do not overlap one another in the circumferential direction, they can closely contact the inner wall of the slots. Therefore, as the number of the slots increases, the inner surface area of the slots increases without decrease in the space factor or the contact area of the in-slot portions with the slot. Thus, an amount of the heat dissipation can be increased, and the temperature rise of the stator winding can be suppressed more effectively.

According to another feature of the invention, each of the coil ends is separated from each other. Therefore, heat-conductive resinous material can be suitably filled in the gaps between the conductor segments of the coil ends.

Further, the insulator material does not directly contact cooling water. Therefore, there would be no chance of short-circuiting or grounding even if it cracks.

According to a further feature of the invention, the stator winding can be supplied with larger current at a motor mode than current generated at a generator mode, while suppressing the size increase and temperature rise of the stator winding.

A generator-motor for a vehicle operates as a motor to start an engine or assist an engine to accelerate the vehicle. The maximum motor current becomes a number of times as much as the maximum output current when it operates as a generator. Such maximum motor current is supplied in a comparatively a short period of time. Therefore, it is very important to suppress temperature rise of a stator winding while the vehicle generator-motor is starting or assisting the engine, in such a short period of time.

The above-stated serial U-shaped-conductor stator winding has a very high conduction space factor, very low heat resistance of the in-slot portions, and a large mass of the in-slot portions. Therefore, the stator winding can stand very large motor current in a short time.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF PREFERRED EMBODIMENTS

Liquid-cooled vehicle rotary electric machines according to some preferred embodiments of the invention are described with reference to the appended drawings.

Figure 1:
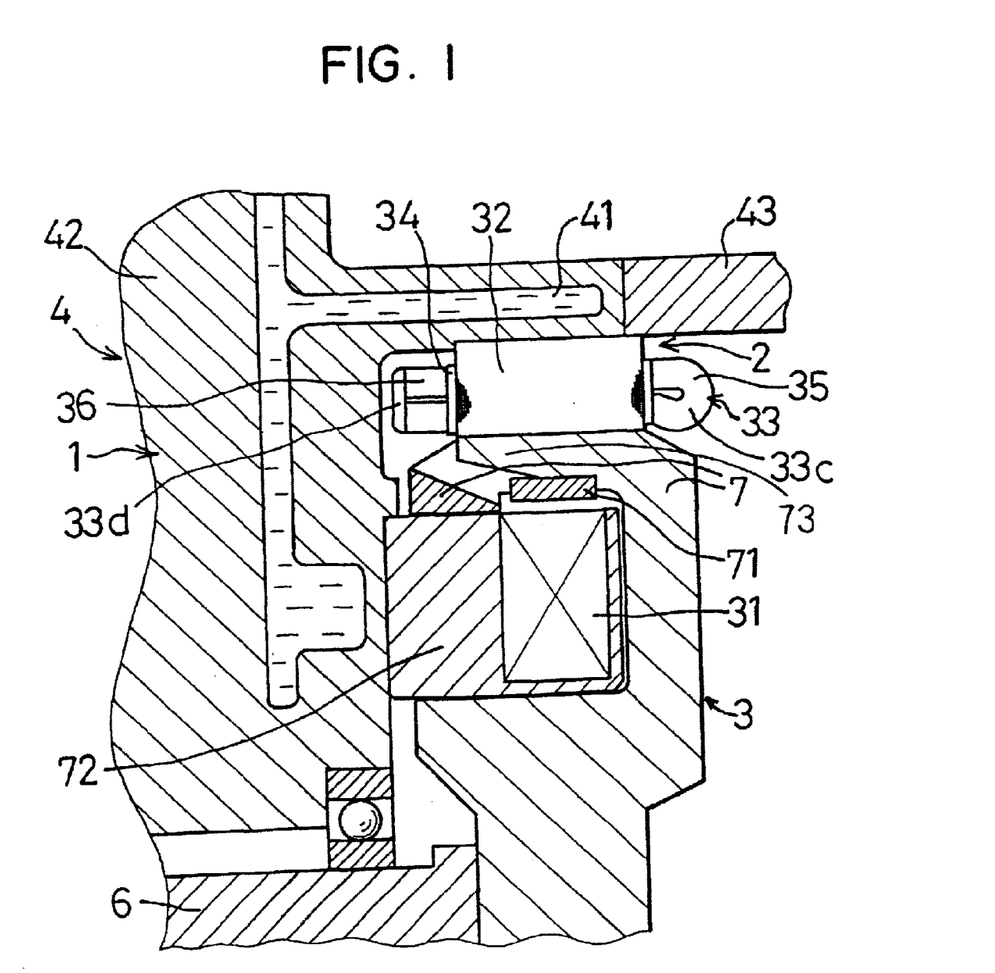
FIG. 1 is a longitudinal cross-sectional view of a main portion of a liquid-cooled rotary electric machine according to a first embodiment of the invention.
Figure 2:
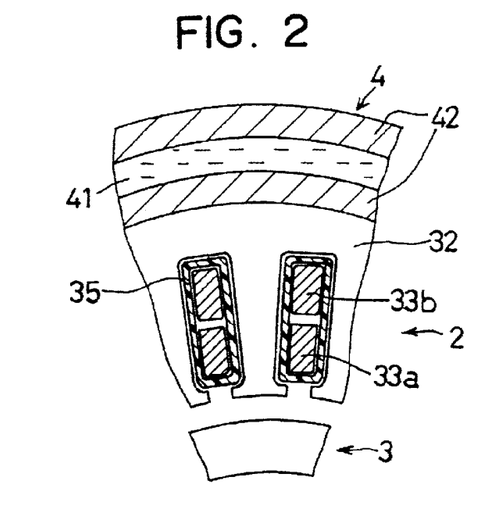
FIG. 2 is a radial cross-sectional view of the portion shown in FIG. 1.

A liquid-cooled rotary electric machine according to a first embodiment of the invention is described with reference to FIGS. 1 and 2.

Liquid-cooled vehicle rotary machine 1 includes stator 2 that operates as an armature, rotor 3 that provides magnetic fields, and frame 4 that supports stator 2 and rotor 3.

Rotor 3 is fixedly fixed to shaft 6, a pair of pole cores 7 having a plurality of claw poles 73, connection ring 71 that connects the pair of pole cores 7, field coil 31, and stationary yoke 72. Shaft 6 is connected with an engine crankshaft, and field coil 31 makes the pair of pole cores 7 generate magnetic field.

Field coil 31 is fitted to an annular groove that is formed in the outer periphery of stationary yoke 72 to open radially outward. Stationary yoke 72 is closely fixed to the rear end of frame 4 at the front surface thereof. The magnetic fluxes flow from field coil 31, through stationary yoke 72, radially inner portion of pole core 7, a half of all claw poles 73 of pole cores 7, stator core 32 of stator 2, the other half of claw poles 73, and stationary core 72, back to field coil 31.

Frame 4 includes front frame 42 and rear frame 43. Front frame 42 has cooling water passage 41 therein, stationary yoke 72 on the rear surface thereof and stator 2 on the inner periphery thereof. Rear frame 43 closes the rear opening of the front frame 42.

Stator 2 has stator core 32 and a stator winding. The stator winding is mainly formed of a plurality of serially connected U-segments (hereinafter referred to as the U-segments) 33 and insulators 34 that insulate the plurality of U-segments 33 from stator core 32. Each of U-segments 33 has a rectangular cross-section. Stator core 32 is formed of laminated electromagnetic iron sheets and has a plurality of slots 35 formed at the inner periphery thereof at equal intervals. A leg of one of U-segments 33 is inserted into the radially outside layer of slot 35 and another leg of another U-segment 33 is inserted into the radially inside layer of the same slot.

Each U-segment 33 has a pair of legs to be inserted into different slots and turn portion 33c connecting the pair of legs. Turn portion 33c projects rearward from the rear end of stator core 32. Portions of the pair of legs disposed in slots 35 are referred to as in-slot portions, and portions of the pair of the legs projecting forward from the front end of stator core 32 are referred to as projecting portions. As shown in FIG. 2, each slot 35 accommodates in-slot portion 33a at the inside layer thereof and in-slot portion 33b at the outside layer. The ends of the projecting portions are bent to extend in opposite circumferential directions to be paired with another so that each pair is welded to form joint 33d. Accordingly, turn portions 33c form rear coil ends 35 and the projecting portions form front coil ends 36.

There is a prescribed distance or space between adjacent conductor segments 33. The stator winding is formed of star-connected X, Y, and Z-phase windings. The open ends of the windings are connected to converter 5, which is connected to a battery.

The stator winding is described in more detail with reference to FIGS. 3–9. The portions shown in FIGS. 3–9 are denoted separately from those shown in FIGS. 1 and 2.

Figure 3:
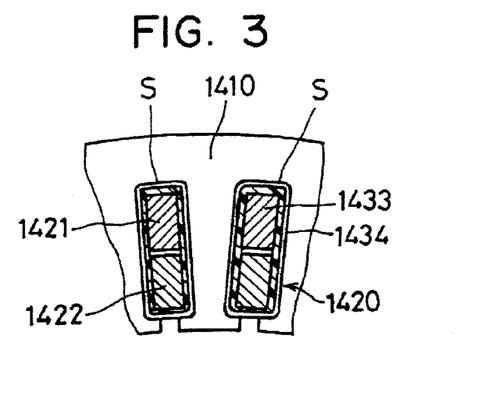
FIG. 3 is a radial cross-sectional view of a portion of the stator shown in FIG. 1.

Stator winding 1420 is a star-connected three-phase winding, which is formed of a plurality of U-segments 1433 or I-shaped conductor segments (hereinafter referred to as I-segment) whose ends are serially welded at an end of stator core 1410.

Figure 4:
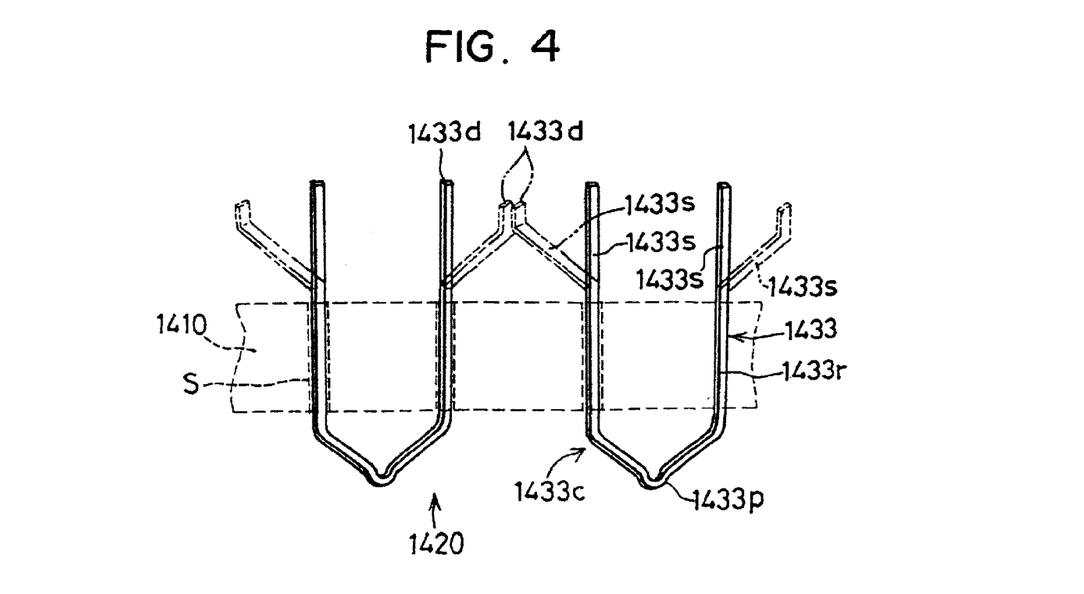
FIG. 4 is a fragmentary schematic diagram illustrating U-segments forming the stator winding shown in FIG. 1.

Each U-segment 1433 is formed of a flat wire coated with an insulation film, and inserted into one of two radial layers of a slot S. As shown in FIG. 4, U-segment 1433 has turn portion 1433c forming a coil end, a pair of in-slot portions 1433r, and a pair of projecting portions 1433s that respectively extend from in-slot portions 1433r. One of the pair of in-slot portions is inserted into a different slot that is π radian in electric angle spaced apart from the other. Each pair of projecting portions 1433s forms coil ends. The ends 1433d of projecting portions 1433s form joint portions.

The center of turn portion 1433c is located at summit 1433p of one of the projecting coil ends remote from the stator core. Turn portion 1433c extends in an axial direction and opposite circumferential directions from summit 1433p so that one side thereof extends by 0.5π radian in electric angle in a circumferential direction. Projecting portion 1433s is also bent to extend in a circumferential direction by 0.5π radian in electric angle.

U-segment 1433 is also bent in the radial direction at summit 1433p so that a half of U-segment 1433 including one side of turn portion 1433c, in-slot portion 1433r and projecting portion 1433s can shift in the radial direction by an approximately radial length of conductor segment 1433 from the other half including the other side of turn portion 1433c, in-slot portion 1433r and projecting portion 1433s.

Figure 5:
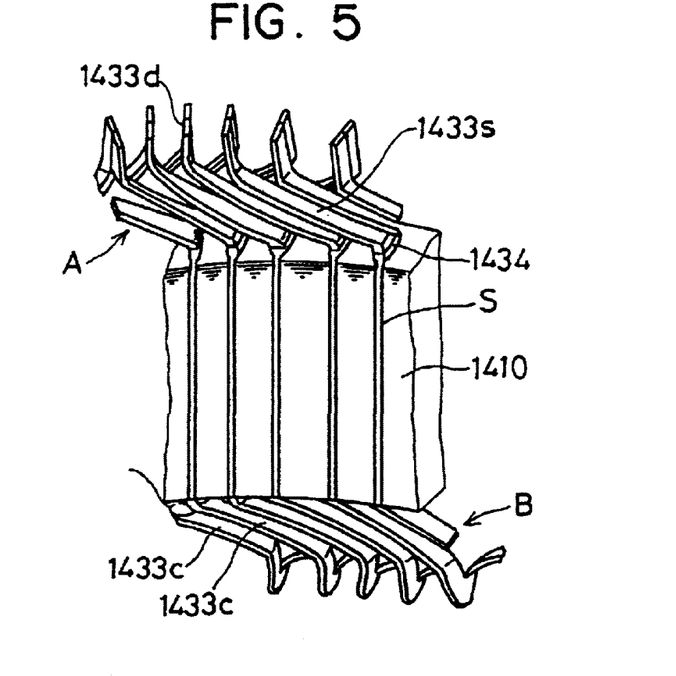
FIG. 5 is a fragmentary perspective view illustrating a portion of the stator shown in FIG. 1.

Each U-segment 1433 is inserted from one end of stator core 1410 into slots S. After pairs of projecting portions 1433c of U-segments projecting from the other end are bent in the circumferential directions, ends 1433d of the projecting portions 1433s are paired and welded to form wave-wound star-connected three-phase stator winding 1420. As shown in FIG. 5, one end 1433d of projecting portion 1433s projecting from the radially outer layer of one of slots S and another end 1433d of projecting portion 1433s projecting from the radially inner layer of another slot S are welded. In FIG. 4, solid lines illustrate projecting portions 1433s before bent, and two-dot-chain lines illustrate the same after bent. Turn portions 1433c are disposed on an end of stator core 1410, and projecting portions 1433s are disposed on the other end.

Figure 6:
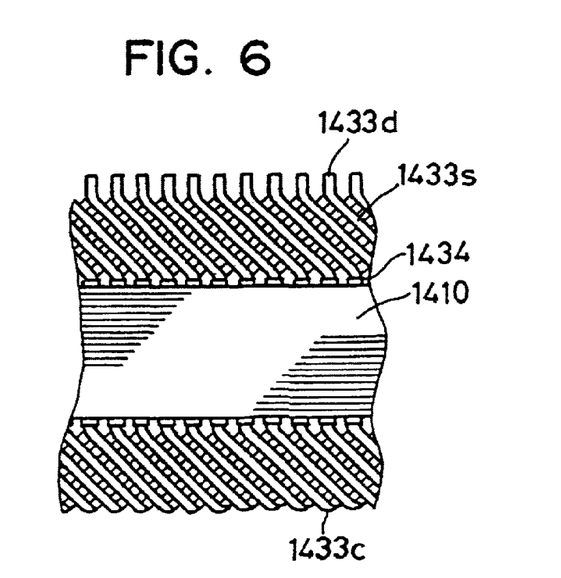
FIG. 6 is a fragmentary development view of the stator shown in FIG. 1 viewed from the center axis thereof in the radially outer direction.

In FIG. 6, reference numeral 1434 indicates an insulator. Insulation sheets 1660 and 1670 are omitted from this diagram.

Figure 7:
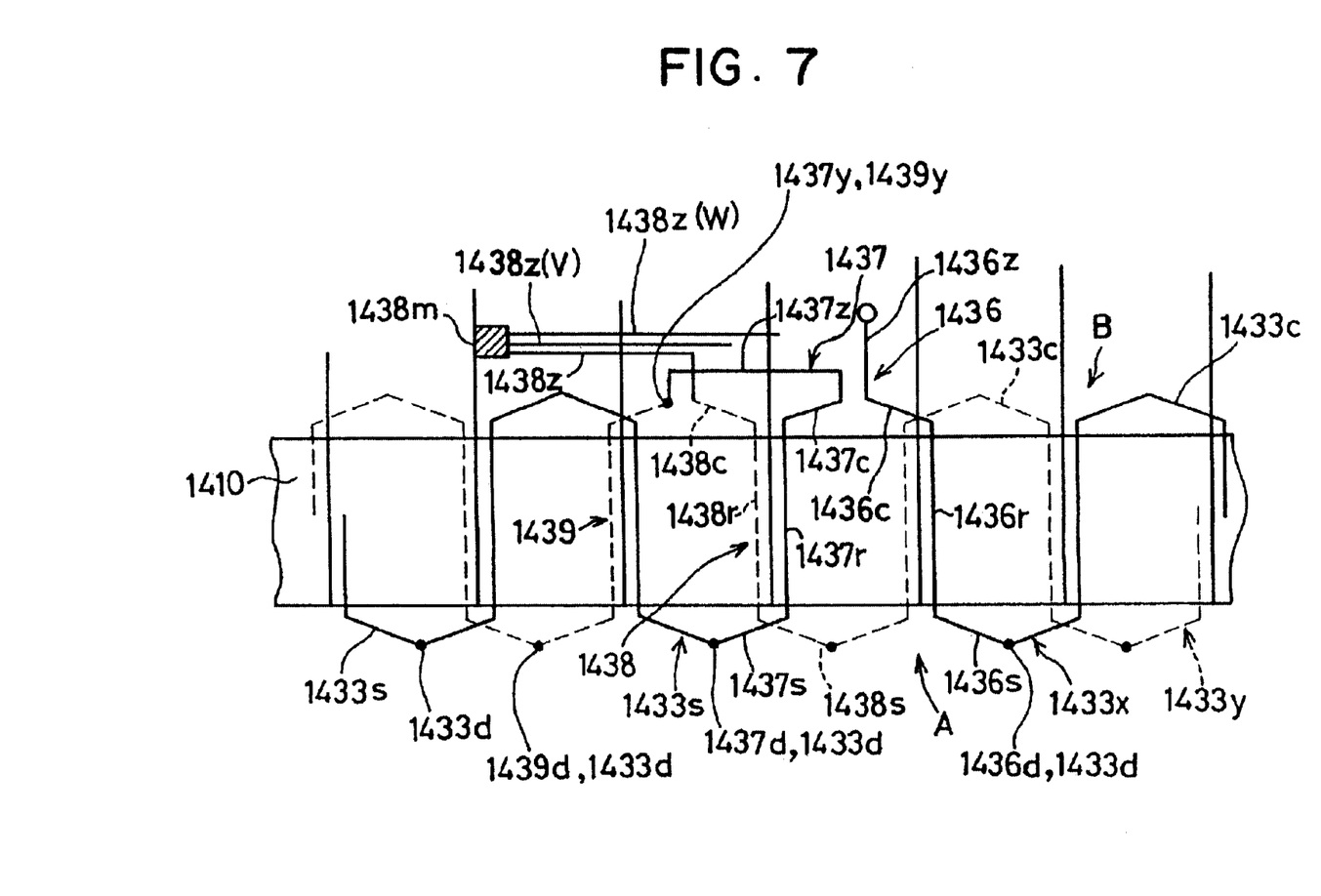
FIG. 7 is a fragmentary development view of the stator winding shown in FIG. 1.
Figure 8:
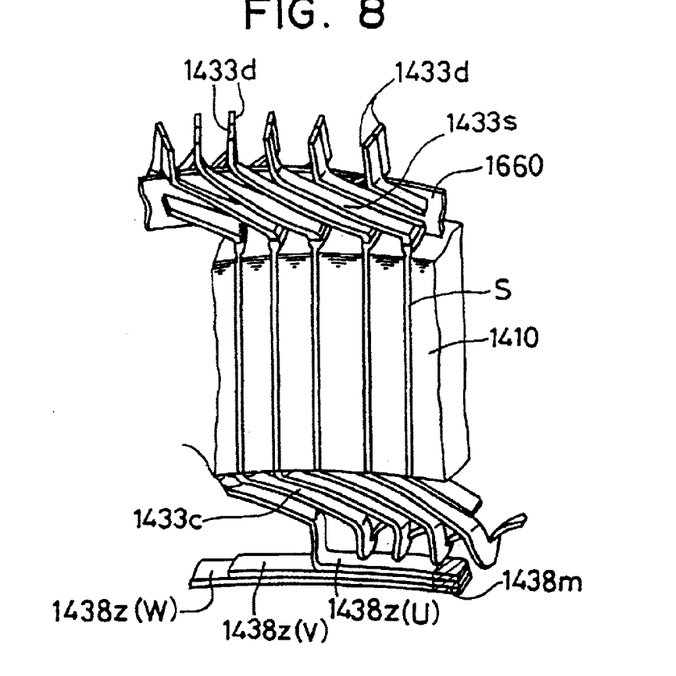
FIG. 8 is a fragmentary perspective view of the stator shown in FIG. 1.

A portion of a winding diagram of the U-phase winding of three-phase-6-pole-18-slot stator winding 1420 is illustrated in FIG. 7.

The U-phase winding is formed from a series connection of wave-wound coils 1433x illustrated by a solid line and wave-wound coil 1433y illustrated by a broken line. The series connection of wave-wound coils 1433x and the series connection of wave-wound coils 1433y are shifted electric angle π from each other. An end of the series connection of wave-wound coil 1433x is comprised of I-segment 1436.

Figure 9:
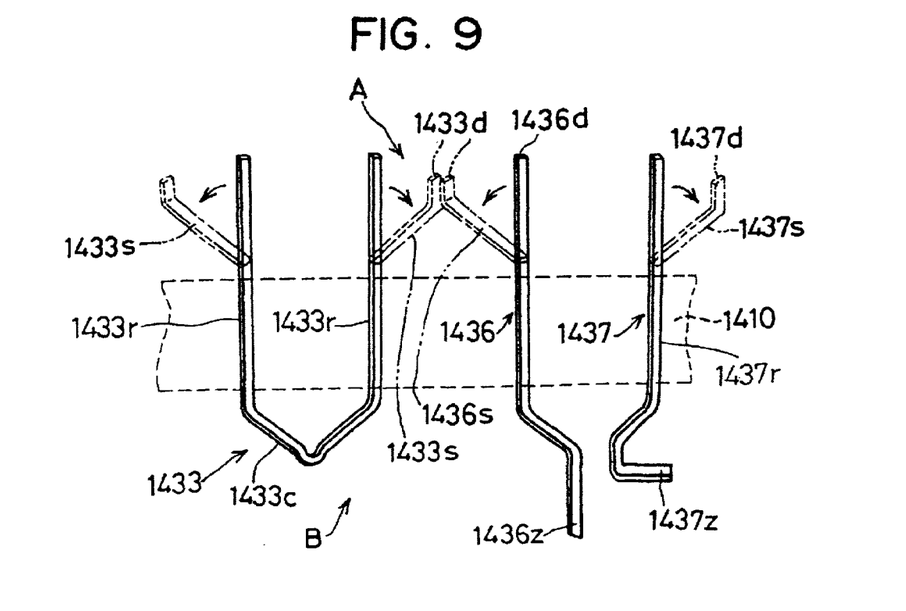
FIG. 9 is a schematic diagram illustrating U-segments that form the stator winding shown in FIG. 1.

I-segment 1436, as shown in FIG. 9, is comprised of projecting portion 1436s, in-slot portion 1436r, half-turn portion 1436c, and output lead wire portion 1436z. I-segment 1436 is formed of a straight conductor segment, which is inserted into the first slots S of the wave-wound coil 1433x. Then projecting portion 1436s is bent, and end 1436d of projecting portion 1435s is welded to end 1433d of the first U-segment 1433. Half-turn portion 1436c is bent to shift a half of the normal pitch of turn portion 1433c in the circumferential direction. Lead wire portion 1436z extends from one end of half turn portion 1436 over a prescribed electric angle in the circumferential direction at a prescribed distance from turn portion 1433c on the side of turn portion 1433c remote from stator core 1410. Lead wire portion 1436z further extends radially outward to connect to a connector (not shown) fixed to a wall of housing. Therefore, lead wire portion 1436z is axially disposed near turn portion 1433c of turn-side coil end group B. The other end of wave-wound coil 1433x is comprised of I-segment 1437.

I-segment 1437 has projecting portion 1437s, in-slot portion 1437r, half-turn portion 1437c, and joint portion 1437z. I-segment 1437 is formed from a straight conductor segment. The straight conductor segment is inserted into the last one of slots S of the series connection of wave-wound coils 1433x and bent at the portion corresponding to projecting portion 1433s, so that end 1437d is welded to end 1433d of U-segment 1433 of wave-wound coil 1433x.

Half-turn portion 1437c extends as long as a half of normal turn portion 1433c in the circumferential direction. Joint portion 1437z extends along a circumference around turn portions 1433c at a certain gap from turn portions 1433c over a necessary arc length. End 1437y is welded to end 1439y of half-turn portion 1439c of I-segment 1439, which is inserted into the first one of slots S of the series connection of wave-wound coils 1433y. I-segment 1439 is the same as I-segment 1437 except joint portion 1439y. Reference numeral 1439d is the end of projecting portion 1439s of I-segment 1439, which is welded to end 1433d of the first one of U-segments 1433 of the series connection of wave-wound coils 1433y. The other end of the series connection of wave-wound coils 1433y is I-segment 1438.

I-segment 1438 has projecting portion 1438s, in-slot portion 1438r, half-turn portion 1438c, and neutral point portion 1438z. I-segment 1438 is formed of a straight conductor segment, which is inserted into the last one of slots S of the series connection of wave-wound coils 1433y. A portion corresponding to projection portion 1438s is bent, so that the end of projecting portion 1438s is welded to end 1433d of the last one of U-segments 1433. Half-turn portion 1438c extends in the circumferential direction as long as a half of normal turn portion 1433c. Neutral point portion 1438z of the U-phase winding extends in a circumference around turn portions 1433c at a distance from turn portions 1433c over a necessary arc length.

Neutral point portions 1438z of I-segments of the V-phase and W-phase windings have the same structure as neutral point portion 1438z of I-segment 1438 of the U-phase winding. However, each neutral point portion 1438z extends with others in a bundle to be welded together at its end 1438m to form the neutral point.

In this embodiment, lead wire portions 1436z, joint portions 1437z, neutral point portions 1438z are extended along the side of coil-end group B or near the axially outer side of turn-portion-side coil ends 1433c.

Thus the following effects of the invention can be provided.

All the in-slot portions can be closely fitted to the inside wall of the slots via insulators or members that are equivalent to the insulators. Therefore, all the in-slot portions can be cooled by cooling water evenly and sufficiently via stator core 32 and front frame 42.

The number (n) of slots is more than three (corresponding to the number (m) of phases of the stator) times as many as the number (p) of the magnetic poles. For example, not 96 slots (that is three times as many as 32 poles) but 192 slots are provided for a 32-pole-three-phase generator; or 144 slots are provided for a 24-pole-three-phase generator. Otherwise stated, the number (n) of the slots is equal to or larger than twice as many as the product of the number (p) of the magnetic poles and the number (m) of the phases of the stator that is, $n \geq 2$ p×m. The extra-many-slot structure increases the contact area of the in-slot portions of conductor segments 33 with the slot inner walls via insulators, so that the heat dissipation of conductor segments can be more improved.

The temperature of coil ends 35 and 36 becomes higher than other portions, contrary to the open type rotary electric machine.

The radial thickness and the axial length of the coil ends of the stator winding formed of serially connected U-segments can be reduced much from a corresponding continuously-wound-wire type stator winding. The volume and average length (from the in-slot portions) of the coil ends can be reduced so that the temperature rise of the coil ends of conductor segments 33 can be drastically reduced.

Heat of the coil ends 35 and 36 can be conducted to the in-slot portion much, thereby to suppress the temperature rise of the coil ends effectively.

Because a sealed type rotary electric machine can be provided without minding temperature rise of the stator winding, a much stronger rotary electric machine against the environmental conditions than conventional rotary electric machine can be provided.

The distance between frame 4 and coil ends 35, 36 is arranged to be more than 2 mm to reduce eddy current loss of frame 4 caused by alternating magnetic fields. It is possible that coil ends 35 and 36 are bent radially inward to increase the above distance. Because conductor segments 33 are rigid enough to keep the distance unchanged, the shape of coil of coil ends 35 and 36 can be maintained unchanged. This can omit the insulation film coating of conductor segments 33.

The conduction space factor can be increased more than 70%.

Since two or four U-segments are radially aligned and inserted into each slot, all the in-slot portions are fitted to the inner walls of the slots via insulators. In addition, at least other two or more surfaces of the U-segment can be fitted to the inner walls of the slots of the heat dissipating stator core via insulators.

None of the in-slot portions is excessively heated to increase the temperature thereof higher than the heat resistant temperature of the insulation coating of the stator winding.

If the generator-motor is supplied to start an engine with much larger amount of input current than output current generated by the same, temperature rise of the stator winding in a short time can be suppressed. Because, the volume of the stator winding relative to the stator core and the heat capacity thereof can be increased.

The liquid-cooled rotary electric machine can be connected to the crankshaft via a belt or a chain as the conventional alternators. This rotary electric machine can be directly connected to the crankshaft or via a gear unit.

This liquid-cooled vehicle rotary electric machine can be used for a generator or a motor. The structure of the rotor or the stator winding can be changed to different types of structure.

Figure 10:
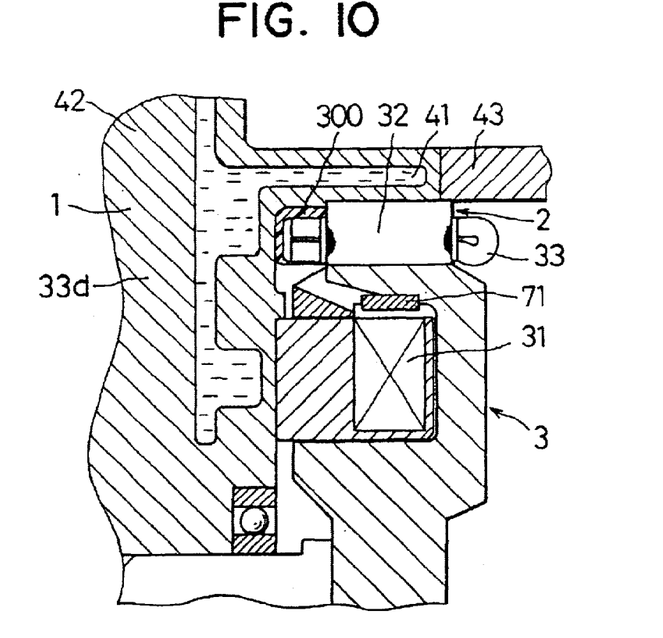
FIG. 10 is a fragmentary longitudinal cross-sectional view of a main portion of a liquid-cooled rotary electric machine according to a second embodiment of the invention.

A liquid-cooled vehicle rotary electric machine according to a second embodiment of the invention is described with reference to FIG. 10.

This embodiment is characterized in that front coil ends 36 of the liquid-cooled vehicle rotary electric machine according to the first embodiment is molded with a heat-conductive resin 300 and brought in contact with the inner periphery and the inside end of front frame 42 of the same embodiment.

In other words, each conductor segment 33 forming coil ends 36 is separated from others other at even gaps. Therefore, it is easy to fill fluid resin 300 into the gaps for the molding.

In addition, the heat of coil ends 36 can be conducted through resin 300 to frame 4, so that the temperature of coil ends 36 can be lowered. Because resin 300 is not in direct contact with the cooling liquid, grounding or short-circuiting of the stator winding would not occur even if resin 300 cracks.

It is also possible to mold coil ends 35 with the same resin.

Figure 11:
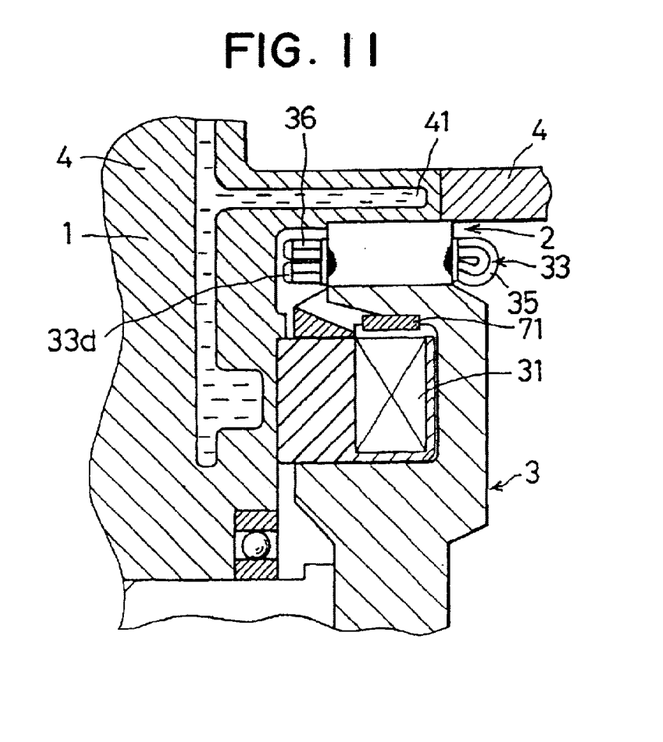
FIG. 11 is a fragmentary longitudinal cross-sectional view of a main portion of a liquid-cooled rotary electric machine according to a third embodiment of the invention.
Figure 12:
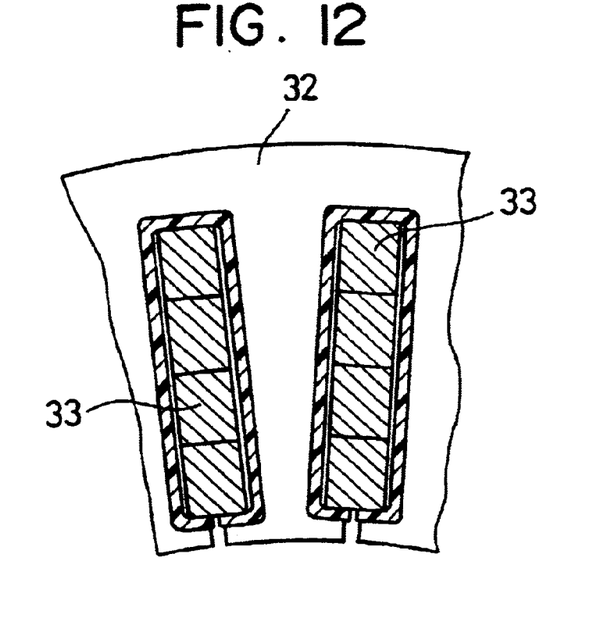
FIG. 12 is a fragmentary enlarged view of the stator shown in FIG. 11.
Figure 13:
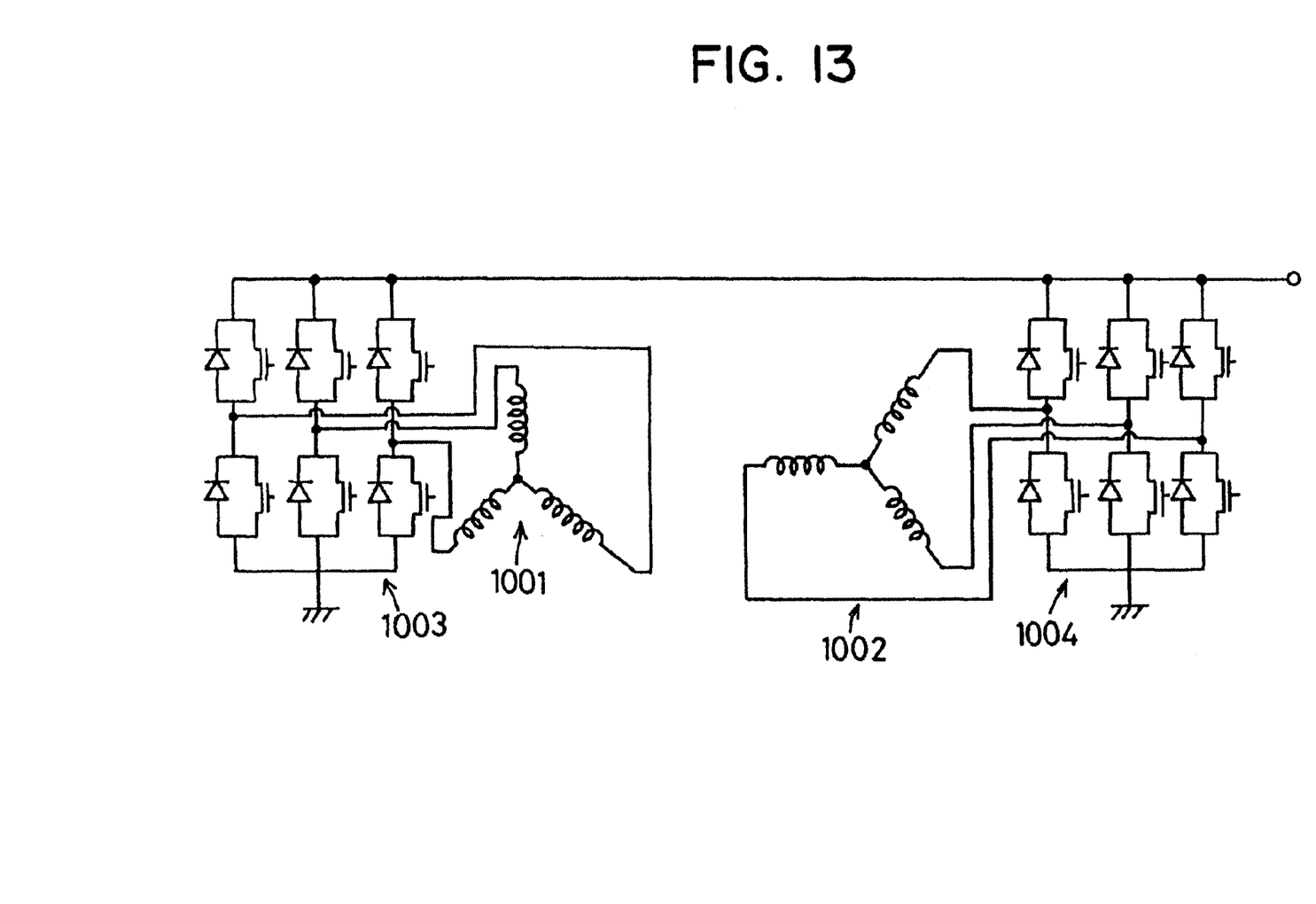
FIG. 13 is a circuit diagram of the stator winding shown in FIG. 11.

A liquid-cooled rotary electric machine according to a third embodiment of the invention is shown in FIGS. 11–13.

This embodiment is the same as the first embodiment except the following: the number of the conductor segments 33 in a slot is 4; there are two three-wave stator windings 1001 and 1002; and two converter 1003 and 1004 are provided. Because there are two circuit systems, the rotary electric machine becomes more reliable.

Figure 14:
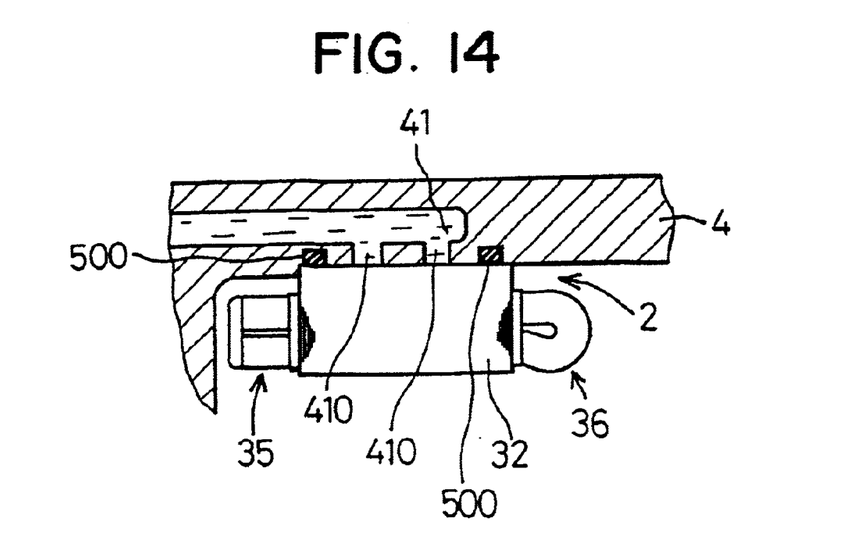
FIG. 14 is a fragmentary longitudinal cross-sectional view of a main portion of a liquid-cooled rotary electric machine according to a fourth embodiment.

A liquid-cooled rotary electric machine according to a fourth embodiment of the invention is shown in FIG. 14.

This embodiment is the same as the first embodiment embodiment except the following: two openings connected to cooling water passage 41 are formed at the inner periphery of frame 4 so that cooling water can directly contact the outer periphery of stator core 32. O-ring 500 is disposed around two openings 410. Therefore, the cooling performance of the stator winding can be improved more.

A liquid-cooled rotary electric machine according to a fifth embodiment of the invention is described hereafter.

This embodiment is the same as the first embodiment except insulator 34, which is modified.

Insulator 34 of this embodiment is made from fine powder of heat-conductive nonmagnetic insulation-resin such as polyimide-contained resin.

Thus, heat transmission resistance, which has been a fatal obstacle to practical use of the rotary electric machine having a liquid-cooled frame, can be drastically reduced without reducing effective magnetic flux or increasing iron loss or copper loss. This can reduce the temperature of the stator winding further.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than a restrictive, sense.

What is claimed is:

1. A liquid-cooled vehicle rotary electric machine operable in a motor mode or a generator mode, comprising:
   a frame having an inner periphery, an outer periphery and a liquid passage that is disposed between said inner periphery and outer periphery;
   a stator core having an outer periphery fixedly fitted to said inner periphery of said flame, opposite core ends and a plurality of slots;
   a multi-phase stator winding accommodated in said plurality of slots, said stator winding including a plurality of U-shaped conductor segments each of which has a turn portion and a pair of legs each of which is inserted in a slot and connected to another at one of said core ends to form a joint coil end; and
   a rotor rotatably supported by said frame and disposed inside said stator core so as to electro-magnetically connect said stator core,
   wherein:
      said liquid passage is disposed near said joint coil end,
      said rotor has a plurality (P) of different magnetic poles alternately disposed at prescribed intervals in the circumferential direction thereof,
      said plurality of slots is disposed in said stator to increase contact area of said U-shaped conductor segments with slot inner walls,
      the number of said slots is equal to or larger than two times as many as the product of the number of said magnetic poles and the number of the phase of said stator, and
      said stator winding has a plurality of conductor segments extending in a circumference around the turn portions of said U-shaped segments to be welded together to form a neutral point.

2. The liquid-cooled rotary electric machine as claimed in claim 1 having a space factor more than 55%, wherein
   each of said U-shaped conductor segments comprises a flat wire.

3. The liquid-cooled vehicle rotary electric machine as claimed in claim 1, wherein
   said stator core and said Stator winding are liquid-tightly enclosed by said frame.

4. The liquid-cooled rotary electric machine as claimed in claim 1, wherein
   each of said legs inserted in said plurality of slots is closely fitted to one of said plurality of slot via an insulator.

5. The liquid-cooled rotary electric machine as claimed in claim 1, wherein
   said stator winding has a plurality of coil ends formed of said u-shaped conductor segments separated from each other,
   each of said coil ends is covered by and filled with insulating material, and
   said insulating material is closely fitted to said frame.

6. The liquid-cooled rotary electric machine as claimed in claim 1, wherein
   said stator winding is supplied with larger current at said motor mode than current generated at said generator mode.

7. The liquid-cooled vehicle rotary electric machine as claimed in claim 1, wherein said joint coil end is spaced more than 2 mm from said frame.

8. The liquid-cooled vehicle rotary electric machine as claimed in claim 1, wherein a space is defined between adjacent conductor segments at said joint coil end.

9. A liquid-cooled vehicle rotary electric machine operable in a motor mode or a generator mode, comprising:
   a frame having an inner periphery, an outer periphery and including a first frame portion and a second frame portion, said first frame portion having a liquid passage disposed between said inner periphery and outer periphery;
   a stator core having an outer periphery, first and second core ends and a plurality of slots, said first core end being fitted to the inner periphery of said first frame portion and said second core end being fitted to said inner periphery of said second frame portions;
   a multi-phase stator winding accommodated in said plurality of slots, said stator winding including a plurality of U-shaped conductor segments each of which has a pair of legs each of which is inserted in a slot and connected to another at said first core end to form a joint coil end; and
   a rotor rotatably supported by said frame and disposed inside said stator core so as to electro-magnetically connect said stator core,
   wherein:
      said rotor has a plurality of different magnetic poles alternately disposed at prescribed intervals in the circumferential direction thereof,
      said plurality of slots is disposed in said stator to increase contact area of said U-shaped conductor segments with slot inner walls,
      the number of said slots is equal to or larger than two times as many as the product of the number of said magnetic poles and the number of the phase of said stator, and said stator winding has a plurality of conductor segments extending in a circumference around the turn portions of said U-shaped segments to be welded together to form a neutral point.

10. The liquid-cooled vehicle rotary electric machine as claimed in claim 1, wherein said frame comprises:

a front frame having a front wail and a cylindrical wall extending in an axial direction from said front wall, the cylindrical wall defining said inner periphery and said outer periphery, said front wall and said cylindrical wall defines an inner cavity in which said stator, said multiphase stator winding and said rotor are housed, said liquid passage being provided in both said front wall and said cylindrical wall, and a rear frame attached to an axial end of said cylindrical wall, and wherein said joint coil end is located in a corner defined by said front wall and said cylindrical wall.

11. The liquid-cooled vehicle rotary electric machine as claimed in claim 10, further comprising:

a stationary yoke fixed to said front wall; and a field coil supported by said stationary yoke, wherein said stationary yoke is located so as to supply magnetic flux to said rotor.

12. The liquid-cooled vehicle rotary electric machine as claimed in claim 11, further comprising:

a shaft which is connected with said rotor and rotatably supported by said front wall, wherein said rotor is driven through said shaft.

13. The liquid-cooled vehicle rotary electric machine as claimed in claim 12, wherein said liquid passage has a wider cooling surface than others at a portion in said frame opposite said stationary yoke.

14. The liquid-cooled vehicle rotary electric machine as claimed in claim 10, further comprising:

a heat-conductive resin member in which said joint coil end is molded is disposed on said corner in a manner that the heat-conductive resin member is in direct contact with said corner.

15. The liquid-cooled vehicle rotary electric machine as claimed in claim 14, wherein said liquid passage has a wider cooling surface than others at a portion in said frame opposite said heat-conductive resin member.

16. The liquid-cooled vehicle rotary electric machine as claimed in claim 9, wherein said frame comprises:

a front frame having a front wall and a cylindrical wall extending in an axial direction from said front wall, the cylindrical wall defining said inner periphery and said outer periphery, said front wall and said cylindrical wall defines an inner cavity in which said stator, said multiphase stator winding and said rotor are housed, said liquid passage being provided in both said front wall and said cylindrical wall; and a rear frame attached on an axial end of said cylindrical wall, wherein said joint coil end is located in a corner defined by said front wail and said cylindrical wall.

17. The liquid-cooled vehicle rotary electric machine as claimed in claim 16, further comprising:

a stationary yoke fixed to said front wall; and a field coil supported by said stationary yoke, wherein said stationary yoke is located so as to supply magnetic flux to said rotor.

18. The liquid-cooled vehicle rotary electric machine as claimed in claim 17, further comprising:

a shaft which is connected with said rotor and rotatably supported by said front wall, wherein said rotor is driven through said shaft.

19. The liquid-cooled vehicle rotary electric machine as claimed in claim 18, wherein said liquid passage defines an enlarged gallery in said frame has a wider cooling surface than others at a portion opposite said stationary yoke.

20. The liquid-cooled vehicle rotary electric machine as claimed in claim 16, further comprising a heat-conductive resin member in which said joint coils end is molded is disposed on said corner in a manner that the head-conductive resin member is in direct contact with said corner.

21. The liquid-cooled vehicle rotary electric machine as claimed in claim 20, wherein said liquid passage defines a wider cooling surface than others at a portion in said frame opposite said heat-conductive resin member.

* * * * *